United States Patent
Yamakawa et al.

(10) Patent No.: US 11,417,035 B2
(45) Date of Patent: Aug. 16, 2022

(54) X-RAY TOMOSYNTHESIS APPARATUS, IMAGE PROCESSING APPARATUS, AND PROGRAM

(71) Applicant: Hitachi, Ltd., Tokyo (JP)

(72) Inventors: Keisuke Yamakawa, Tokyo (JP); Keiko Takahashi, Tokyo (JP); Tadashi Nakamura, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 225 days.

(21) Appl. No.: 16/889,110

(22) Filed: Jun. 1, 2020

(65) Prior Publication Data
US 2020/0410727 A1 Dec. 31, 2020

(30) Foreign Application Priority Data
Jun. 25, 2019 (JP) .............................. JP2019-117683

(51) Int. Cl.
*G01N 23/00* (2006.01)
*G06T 11/00* (2006.01)
*G06K 9/62* (2022.01)
*G01N 23/044* (2018.01)

(52) U.S. Cl.
CPC .......... *G06T 11/008* (2013.01); *G01N 23/044* (2018.02); *G06K 9/6215* (2013.01); *G06T 11/006* (2013.01); *G01N 2223/401* (2013.01)

(58) Field of Classification Search
CPC ...................... G01N 2223/401; G01N 23/044
See application file for complete search history.

(56) References Cited

FOREIGN PATENT DOCUMENTS

| JP | 2016112248 A | 6/2016 |
| JP | 6317511 B1 * | 4/2018 |
| JP | 6317511 B1 | 4/2018 |

OTHER PUBLICATIONS

JP6317511. English Translation. Apr. 2018. Translated 2022.*

* cited by examiner

*Primary Examiner* — Dani Fox
(74) *Attorney, Agent, or Firm* — Mattingly & Malur, PC

(57) ABSTRACT

An X-ray tomosynthesis apparatus accurately extracts a region of a small high absorber in a subject on 2D measurement projection data. When pieces of the 2D measurement projection data for each of a plurality of projection angles are arranged in a projection angle direction, the 2D measurement projection data is shifted in a 2D plane so that part or all of a range of a high absorber region included in the 2D measurement projection data overlaps at least a range of the high absorber region included in 2D measurement projection data at an adjacent projection angle in an in-plane direction of the 2D plane. The 2D measurement projection data for each of the plurality of projection angles after shifting is arranged in the projection angle direction to obtain 3D measurement projection data, and a 3D region is obtained from a first start point by a region expansion process.

10 Claims, 11 Drawing Sheets

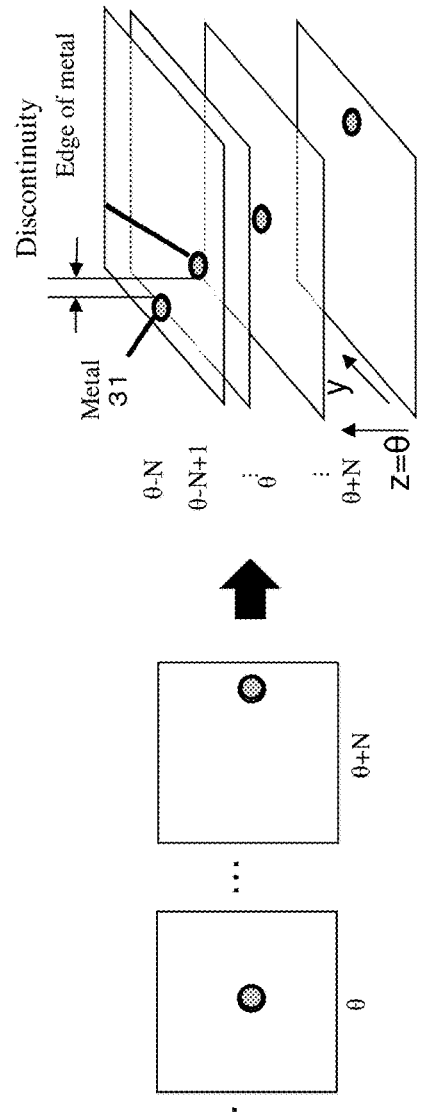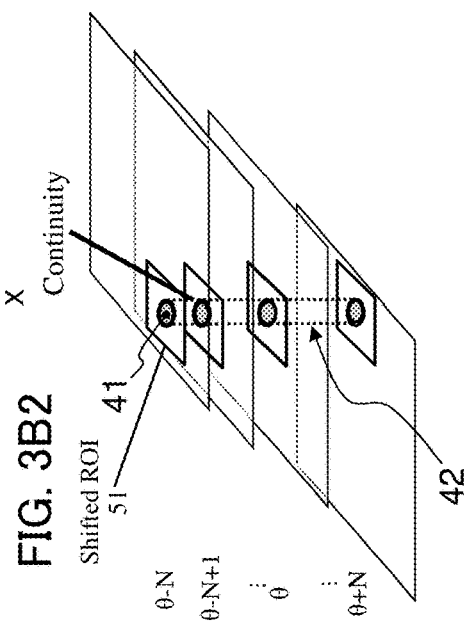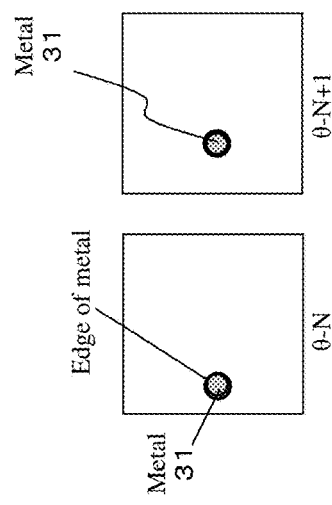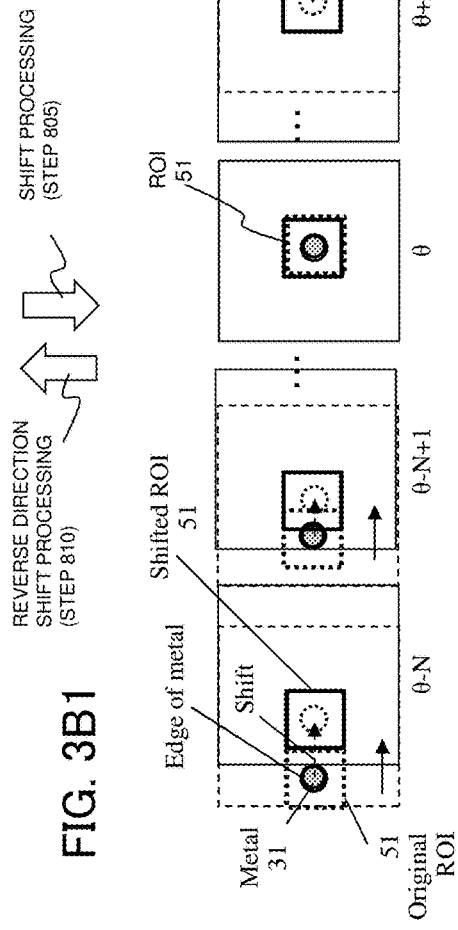
FIG. 3A1
FIG. 3A2
FIG. 3B1
FIG. 3B2

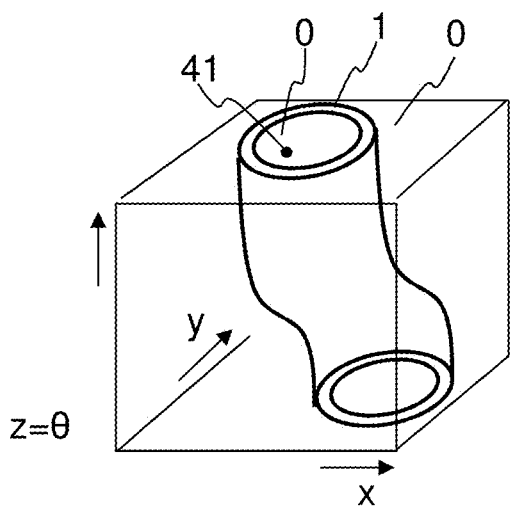
FIG. 10A
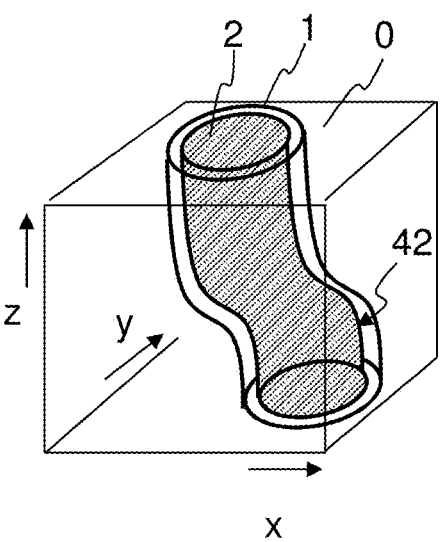
FIG. 10B
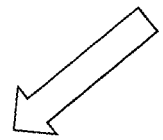
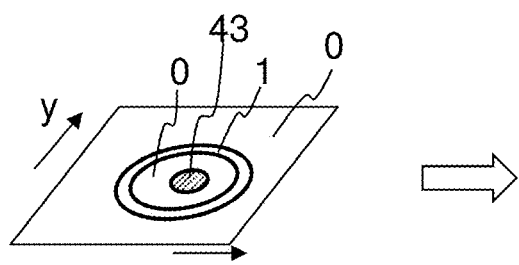
FIG. 10C
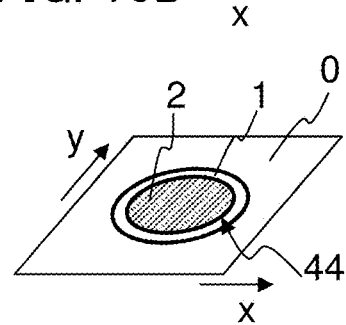
FIG. 10D

X-RAY TOMOSYNTHESIS APPARATUS, IMAGE PROCESSING APPARATUS, AND PROGRAM

CROSS-REFERENCE TO RELATED APPLICATION

The present application claims priority from Japanese application JP2019-117683, filed on Jun. 25, 2019, the contents of which is hereby incorporated by reference into this application.

BACKGROUND OF THE INVENTION

1. Field of the Invention

The present invention relates to an X-ray tomosynthesis apparatus, and more particularly to signal processing and a reconstruction technology for reducing an artifact component generated from a high absorber in a tomosynthesis image.

2. Description of the Related Art

Similarly to an X-ray CT apparatus, an X-ray tomosynthesis apparatus is an apparatus that irradiates a subject with X-rays from a plurality of projection angles, calculates an X-ray absorption coefficient of each point in the subject from obtained measurement projection data, and obtain an X-ray absorption coefficient distribution image. Normally, the X-ray absorption coefficient is replaced with a Hounsfield unit value (air is −1000, water is 0) standardized by air and water and used for diagnosis.

The X-ray tomosynthesis apparatus can generate a tomographic surface of a subject for a plurality of surfaces parallel to a coronal plane including a body axis direction and a left-right direction of a body. In medical practice, use of tomosynthesis images is clinically useful since a condition of a patient can be immediately diagnosed based on tomographic surfaces at different positions. However, the X-ray tomosynthesis apparatus has a projection angle range of 20 to 40 degrees, and the projection angle range is narrower than that of the X-ray CT apparatus that captures images in a projection angle range of at least 180 degrees. For this reason, when there is a high absorber having a large X-ray absorption coefficient such as metal inside the subject, there are problems that an artifact is generated at a boundary thereof and an afterimage is generated on a surface adjacent to a tomographic surface where the high absorber is located and another tomographic surface. In this specification, these problems are referred to as "high absorber artifacts". The high absorber artifacts cause clinically poor diagnostic performance.

A reason for generation of the high absorber artifacts will be described in detail. The X-ray tomosynthesis apparatus uses an analytical reconstruction method based on a Filtered Back Projection (hereinafter, referred to as FBP) method such as the well-known Feldkamp method to acquire a tomosynthesis image. In the FBP method, during back projection calculation, to allow restoration of a shape and an abruption value of a subject such as a microsphere made of a substance having a large X-ray absorption coefficient, which causes a sharp rise or fall of measurement projection data at a boundary with a surrounding tissue, a high-frequency emphasized reconstruction filter is applied to the measurement projection data. The reconstruction filter is designed so that high-frequency information is canceled out on the reconstructed image when back projection calculation is performed on the measurement projection data collected in an imaging angle range of at least 180 degrees. For this reason, when the imaging angle range is small as in the X-ray tomosynthesis apparatus, a shape and an absorption value of a subject such as a high absorber in which a difference in a measurement projection data value from a surrounding tissue becomes sharp may not be completely restored, and an artifact is generated due to a high-frequency component emphasized by the FBP method.

In order to reduce this artifact, a method has been proposed in which a value of a high absorber region is replaced using an absorption value of a surrounding tissue to reduce a difference from a surrounding tissue, and a method has been proposed in which a high-absorber is separated from measurement projection data. For example, JP-A-2016-112248 discloses a technology in which a high absorber region of radiation is extracted from projection data acquired by tomosynthesis shooting, a feature amount of a size or a shape of the extracted high absorber region is calculated, and a pixel of the high absorber region in the projection data is interpolated based on the feature amount. For this reason, it is important to accurately extract the high absorber region in order to obtain an image having reduced artifacts.

However, in the tomosynthesis image, a change width of a pixel value in one image is large, and it may be difficult to extract the high absorber region by threshold processing such as binarization processing. For this reason, the high absorber region is extracted by a known region expanding method. The region expanding method is a method of successively expanding the region by repeating a process of determining a point at which region extraction is started and performing addition to the region when a pixel value of a pixel near the start point satisfies a predetermined condition. However, there are at least 20 or more pieces of measurement projection data for each projection angle acquired by tomosynthesis shooting, and when an operator sets a start point or a start region for each piece of the measurement projection data, it becomes a burden on the operator.

To solve this problem, in a technology disclosed in Japanese Patent No. 6,317,511, the region expanding method is three-dimensionally performed using three-dimensional (3D) projection data obtained by stacking two-dimensional (2D) (xy plane) measurement projection data of a plurality of projection angles with a projection angle θ set to a z direction, thereby extracting a 3D high absorber region. Then, starting from a point in a region occupied by the extracted 3D high absorber region in each piece of the 2D measurement projection data, the region expanding method is performed for each piece of 2D projection data. In this way, since the operator may not set a start point for each of a plurality of pieces of 2D projection data, and finally performs the region expanding method for each piece of the 2D projection data, the high absorber region can be extracted with high accuracy.

In the technology disclosed in Japanese Patent No. 6,317,511, as illustrated in FIGS. 10A to 10D, region expansion is performed in 3D measurement projection data (FIG. 10A) to obtain a high absorber region 42 (FIG. 10B), and region expansion is performed in 2D measurement projection data (FIG. 10C) using a point 43 in the obtained high absorber region 42 as a start point. In this way, it is possible to extract a 2D high absorber region 44 with high accuracy (FIG. 10D).

Since the tomosynthesis apparatus irradiates a subject with X-rays from a plurality of projection angles, similarly to the X-ray CT device, imaging is performed while rotating an X-ray source relative to a predetermined center of rotation within a predetermined angle range. When a size of the high absorber (metal, etc.) in the subject is small and the high absorber is present at a position shifted from a center of rotation of an X-ray irradiation apparatus, a diameter of a projection image of the high absorber in 2D measurement projection data (xy plane) (FIG. 11A) is small, and coordinates thereof on the xy plane are shifted for each projection angle (rotation angle). Thus, when adjacent pieces of 2D measurement projection data are viewed from a z direction, a positional relationship may be such that projection images of the high absorber do not overlap. For example, when the high absorber is a sphere having a small diameter and shifted from the center of rotation, a high absorber region (FIG. 11B) in 3D measurement projection data has a thin columnar shape, and a major axis thereof is inclined at a large angle with respect to a normal (z direction) of a 2D plane (xy plane) of the measurement projection data. For this reason, when adjacent pieces of the 2D measurement projection data are overlapped in the z direction, projection images of the high absorber may not overlap in the xy plane, and the high absorber region may not be continuous in the z direction.

In this case, even when the region expanding method is performed on the 3D measurement projection data as in Japanese Patent No. 6,317,511, since the high absorber region is not continuous in the z direction, region expansion may not be performed. For this reason, there occurs a problem that the high absorber region may not be extracted by the technology of Japanese Patent No. 6,317,511.

SUMMARY OF THE INVENTION

An object of the invention is to provide an X-ray tomosynthesis apparatus capable of accurately extracting a small high absorber region in a subject on 2D measurement projection data.

To achieve the object, an X-ray tomosynthesis apparatus of the invention includes an X-ray generator that irradiates a subject with an X-ray, an X-ray detector that detects an image obtained by projecting the X-ray transmitting through the subject onto a 2D plane to obtain 2D measurement projection data, a mechanism unit that relatively moves at least one of the X-ray generator and the X-ray detector with respect to the subject and irradiates the subjects with X-rays from a plurality of different projection angles, a high absorber processing unit that extracts each high absorber region of an X-ray included in the 2D measurement projection data for each of the plurality of projection angles and converts a measurement projection data value of the high absorber region, and an image reconstruction unit that reconstructs a tomosynthesis image based on a plurality of pieces of 2D measurement projection data processed by the high absorber processing unit.

The high absorber processing unit includes a shift processing unit, a 3D region extraction unit, and a 2D region extraction unit. The shift processing unit shifts the 2D measurement projection data in the 2D plane so that when pieces of the 2D measurement projection data for each of the plurality of projection angles are arranged in a projection angle direction, a part or all of a range of the high absorber region included in the 2D measurement projection data overlaps at least a range of the high absorber region included in 2D measurement projection data at an adjacent projection angle in an in-plane direction of the 2D plane. The 3D region extraction unit arranges the 2D measurement projection data for each of the plurality of projection angles shifted by the shift processing unit in the projection angle direction to obtain 3D measurement projection data, performs a region expansion process on the 3D measurement projection data from a preset first start point to obtain a 3D region satisfying a predetermined condition, and obtains a region occupied by the 3D region in the 2D measurement projection data.

According to the invention, since a small high absorber region included in 2D measurement projection data can be accurately extracted, an image in which artifacts are suppressed can be obtained by processing a data value of the extracted high absorber region and performing image reconstruction.

BRIEF DESCRIPTION OF THE DRAWINGS

FIG. 3A1 is a diagram illustrating 2D measurement projection data including a minute high absorber region, FIG. 3A2 is a diagram illustrating 3D measurement projection data in which pieces of 2D measurement projection data are arranged in a projection angle direction, FIG. 3B1 is a diagram obtained by shifting the 2D measurement projection data including the minute high absorber region in the embodiment, and FIG. 3B2 is a diagram illustrating 3D measurement projection data in which pieces of the shifted 2D measurement projection data are arranged in the projection angle direction in the embodiment;

FIGS. 10A to 10D are explanatory diagrams illustrating a procedure for extracting a high absorber region in conventional measurement projection data.

DETAILED DESCRIPTION OF THE INVENTION

Hereinafter, an embodiment of the invention will be successively described with reference to the drawings.

Figure 1:
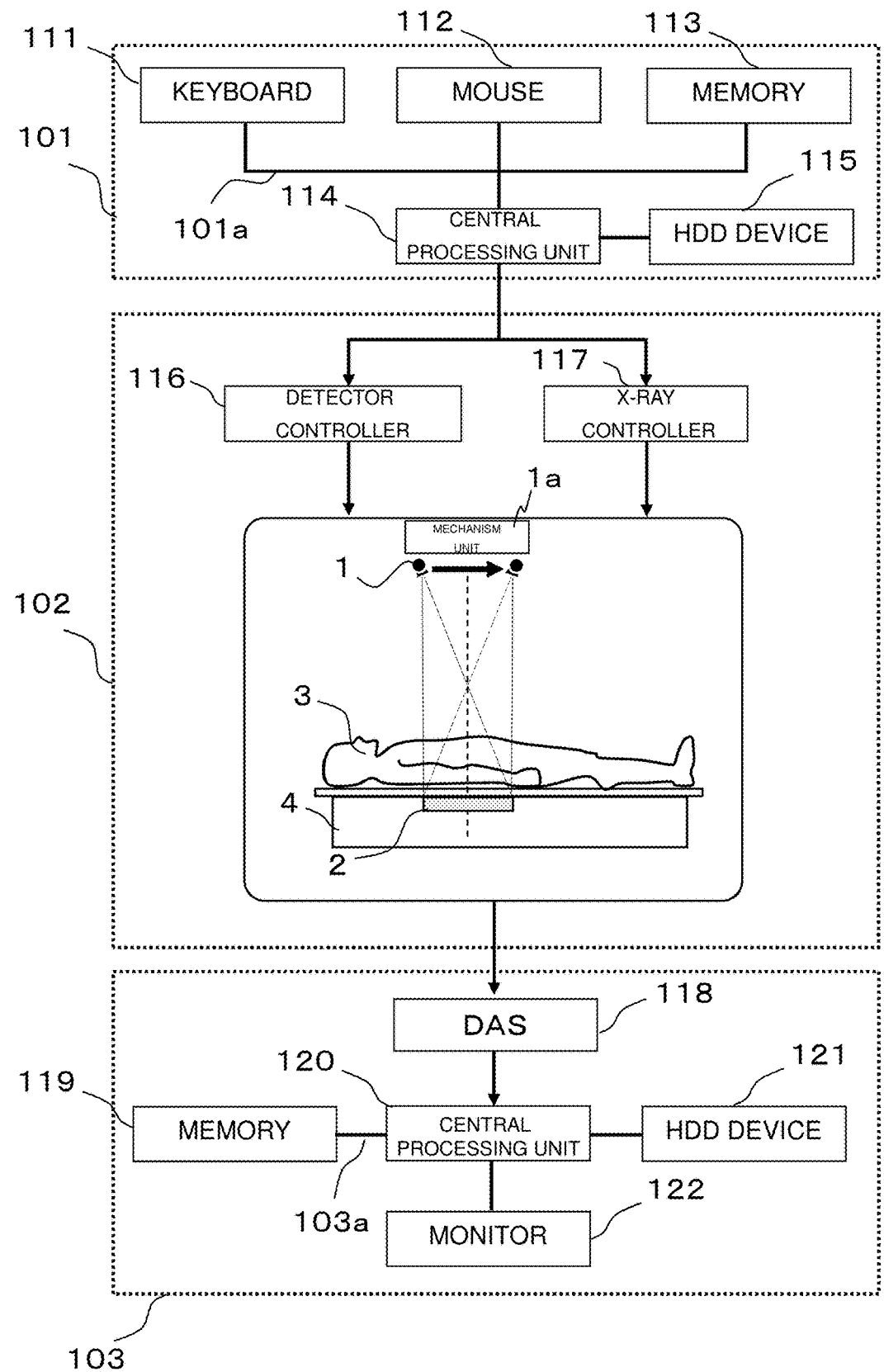
FIG. 1 is a block diagram for description of a configuration of hardware of each unit of an X-ray tomosynthesis apparatus in an embodiment.
Figure 2:
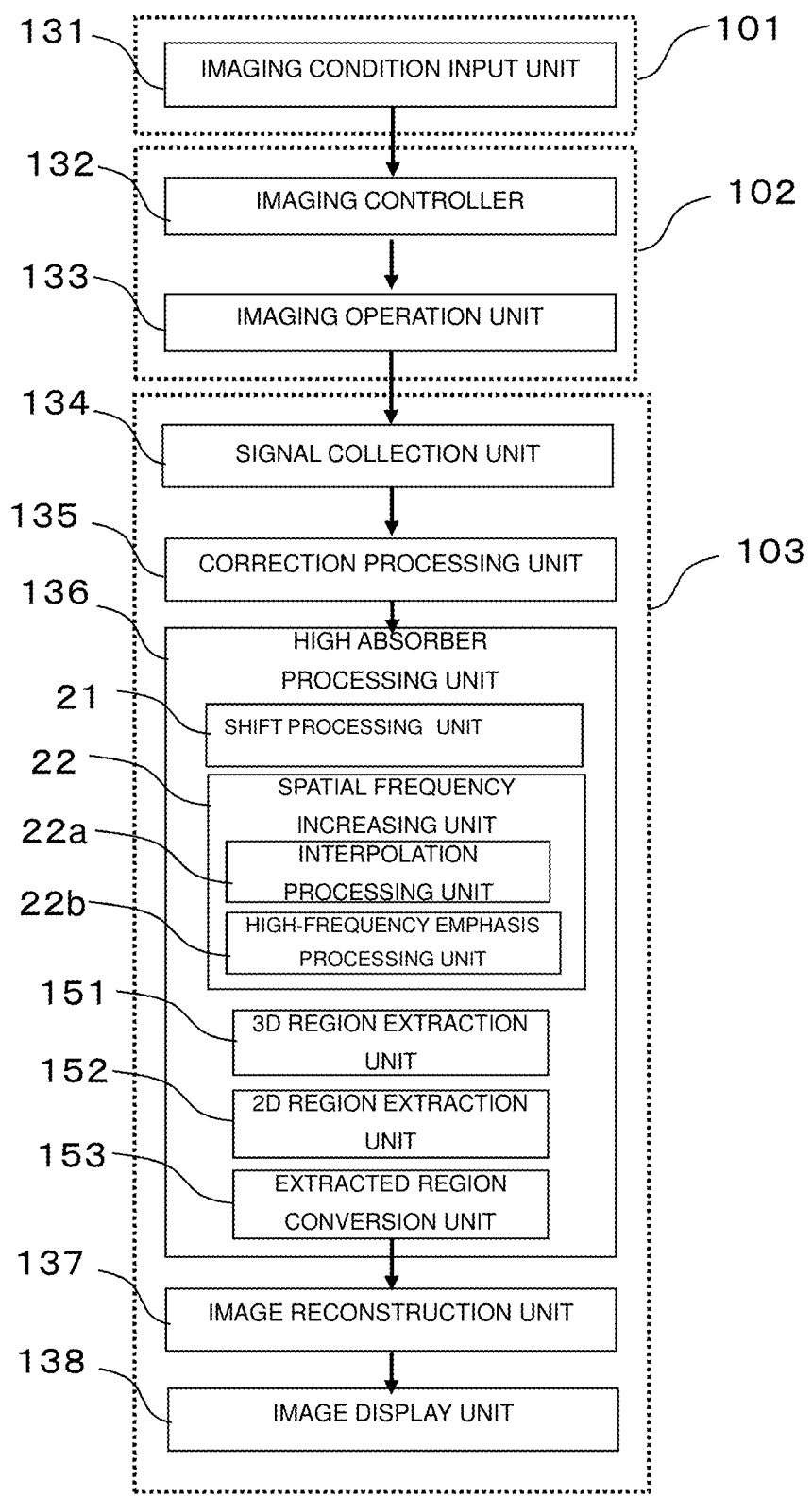
FIG. 2 is a functional block diagram of the X-ray tomosynthesis apparatus in the embodiment.

FIG. 1 illustrates a diagram of a hardware configuration of an X-ray tomosynthesis apparatus according to the embodiment, and FIG. 2 illustrates a functional block diagram illustrating a function of the X-ray tomosynthesis apparatus according to the embodiment. As illustrated in FIG. 2, the present embodiment includes at least an imaging unit 102, a high absorber processing unit 136, and an image reconstruction unit 137. As illustrated in FIG. 1, the imaging unit 102 includes an X-ray generator 1 for irradiating a subject 3 with an X-ray, an X-ray detector 2 that detects an image obtained by projecting an X-ray transmitting through the subject 3 onto a 2D plane and obtains 2D measurement projection data, and a mechanism unit 1a that moves at least one of the X-ray generator and the X-ray detector relative to the subject 3 and irradiates the subject 3 with X-rays from a plurality of different projection angles. The high absorber processing unit 136 extracts each high absorber region of an X-ray included in measurement projection data for each of the plurality of projection angles, and converts data values of the high absorber region. The image reconstruction unit 137 reconstructs a tomosynthesis image based on a plurality of pieces of 2D measurement projection data processed by the high absorber processing unit 136.

Here, as illustrated in FIG. 2, the high absorber processing unit 136 includes a shift processing unit 21, a 3D region extraction unit 151, a 2D region extraction unit 152, and an extracted region conversion unit 153.

The shift processing unit 21 shifts 2D measurement projection data in a 2D plane thereof (FIG. 3B1) such that when pieces of 2D measurement projection data for each of a plurality of projection angles (FIG. 3A1) are arranged in a projection angle direction FIG. 3A2, a part or all of a range of a high absorber region 31 included in the 2D measurement projection data overlaps at least a range of a high absorber region 31 included in 2D measurement projection data at an adjacent projection angle in an in-plane direction. Note that the adjacent or contiguous projection angle corresponds not only to a projection angle different by at least ±1 piece but also to a projection angle different by ±2 pieces or more or a plurality of projection angles including ±1, ±2 pieces, etc.

Figure 4A:
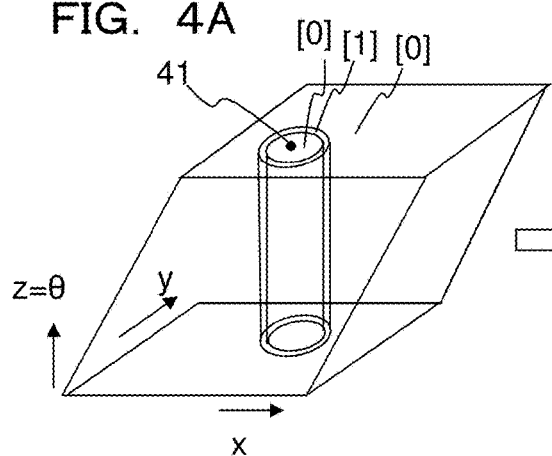
FIG. 4A is an explanatory diagram illustrating a result of processing 3D measurement projection data by a 3D differential processing unit 161 and a first start point 41 in the embodiment.
Figure 4B:
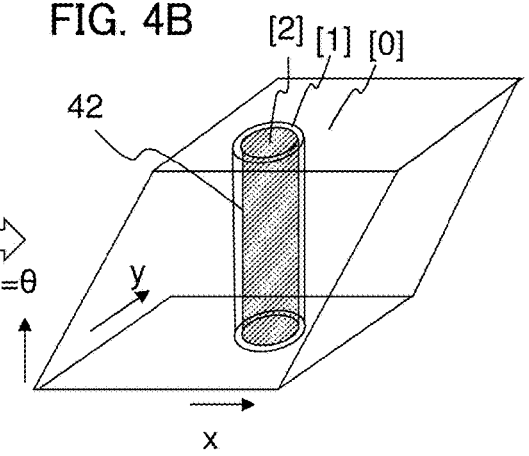
FIG. 4B is an explanatory diagram illustrating a processing result of a 3D region expansion unit 163.

The 3D region extraction unit 151 obtains 3D measurement projection data by arranging pieces of 2D measurement projection data for each of a plurality of projection angles shifted by the shift processing unit 21 in the projection angle direction (FIG. 3B2 and FIG. 4A), and performs a region expansion process on the 3D measurement projection data from a first start point 41 set in advance to obtain a 3D high absorber region 42 satisfying a predetermined condition (FIG. 4B).

Figure 4C:
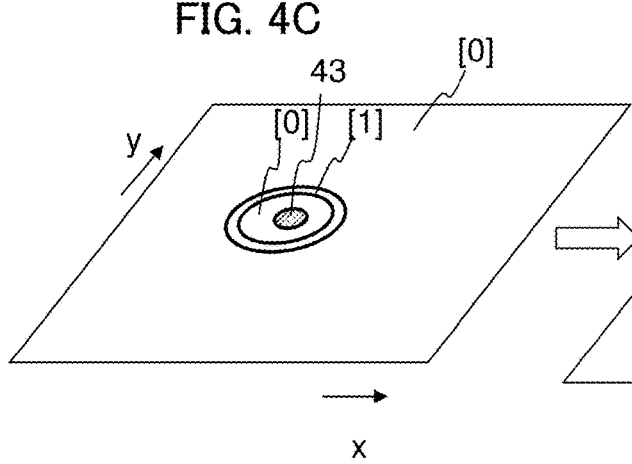
FIG. 4C is an explanatory diagram illustrating a processing result of a 2D differential processing unit 164 and a second start point 43.

The 2D region extraction unit 152 performs a region expansion process using a point 43 in a range occupied by the 3D high absorber region 42 in the 2D measurement projection data as a second start point in the 2D measurement projection data (FIG. 4C). In this way, a 2D high absorber region 44 satisfying a predetermined condition is obtained.

The extracted region conversion unit 153 uses the 2D high absorber region 44 as a high absorber region of an X-ray included in the 2D measurement projection data to convert a data value thereof. For example, the extracted region conversion unit 153 converts a value of the measurement projection data of the 2D high absorber region 44 into a value of measurement projection data when an X-ray absorption rate is lower than that of the high absorber without using a value of a peripheral region.

Then, the image reconstruction unit 137 performs image reconstruction using the measurement projection data after conversion processing, so that even when the FBP method is used, conversion into the value of measurement projection data when the X-ray absorption rate is low is performed. Thus, by the FBP method, it is possible to prevent a high-frequency component from being overemphasized, and to suppress a high absorber artifact.

As described above, in the present embodiment, since the high absorber processing unit 136 can accurately extract a region of the high absorber having a minute size on the 2D measurement projection data, it is possible to generate an image in which artifacts are suppressed.

Note that it is possible to adopt a configuration in which image reconstruction is performed after the measurement projection data value is converted using the range occupied by the 3D high absorber region 42 in the 2D measurement projection data for each projection angle as a 2D high absorber region in the 2D measurement projection data without change.

Note that the 2D region extraction unit 152 performs a process of shifting the 2D measurement projection data in a reverse direction to cancel out a shift amount of shifting the 2D measurement projection data by the shift processing unit 21 before or after performing a region expansion process on the 2D measurement projection data.

Figure 5A:
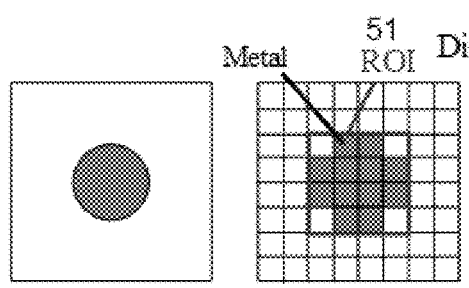
FIG. 5A is a diagram illustrating each of an image of a high absorber projected on a 2D plane, 2D measurement projection data obtained by detecting the image, and a contour of a high absorber region extracted by a 2D region extraction unit.
Figure 5B:
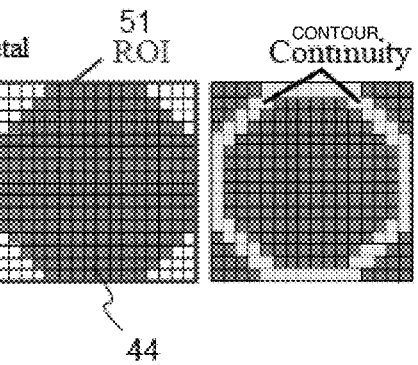
FIG. 5B is a diagram illustrating each of data obtained by increasing a spatial frequency of a region of interest (ROI) including the high absorber region of the 2D measurement projection data of the embodiment, and a contour of the high absorber region to be extracted.

In addition, in the present embodiment, the high absorber processing unit 136 may further include a spatial frequency increasing unit 22. The spatial frequency increasing unit 22 includes an interpolation processing unit 22a and a high-frequency emphasis processing unit 22b. The interpolation processing unit 22a sets a region of interest (ROI) 51 including a high absorber region for each projection angle for 2D measurement projection data before processing by the shift processing unit 21 or 2D measurement projection data after processing by the shift processing unit 21 and before processing by the 3D region extraction unit 151 (FIG. 3B1 and FIG. 5A), and performs an interpolation process on at least data in the ROI 51 to increase the spatial frequency (FIG. 5B). The high-frequency emphasis processing unit 22b clarifies a contour of the high absorber region by performing high-frequency emphasis processing on data after the interpolation process.

As described above, the spatial frequency increasing unit 22 increases the spatial frequency of the data of the ROI 51 including the high absorber region, so that even when the high absorber region is a small region, a contour shape can be represented with high definition. Therefore, in the 3D region extraction unit, the high absorber region can be extracted with high accuracy up to the contour.

Note that in the present embodiment, the start point refers to a point at which region extraction starts or a point included in a region (shape) in which region extraction starts. The 3D region extraction unit 151 and the 2D region extraction unit 152 of the high absorber processing unit 136 expand (or reduce) the start point or the region (shape) including the start point, thereby extracting the high absorber region.

Note that in the X-ray tomosynthesis apparatus of the present embodiment, the subject means an imaging target, and includes the subject 3 and a bed 4 supporting the subject 3. Note that the subject 3 is not limited to a human body, and may correspond to an object to be inspected such as a phantom or a machine.

Hereinafter, the X-ray tomosynthesis apparatus of the embodiment will be described more specifically with reference to the drawings. FIG. 1 is a diagram illustrating a hardware configuration of the X-ray tomosynthesis apparatus. In the X-ray tomosynthesis apparatus, functions of a correction processing unit 135, the high absorber processing unit 136, and the image reconstruction unit 137 in an image generation unit 103 are implemented by software. FIG. 2 is a functional block diagram of the X-ray tomosynthesis apparatus implemented by various types of software, etc.

As outlined above, the X-ray tomosynthesis apparatus of the present embodiment includes an input unit 101 that inputs an imaging condition such as an X-ray irradiation condition and a condition of image reconstruction, an imaging unit 102 that controls imaging, irradiates and detects an X-ray, and outputs measurement projection data, and the image generation unit 103 that performs correction processing, high absorber processing, or image reconstruction on measurement projection data corresponding to a detected signal to output an image. Note that the input unit 101 and the image generation unit 103 may not be integrally formed with a main body apparatus including the imaging unit 102, and may be disposed at a location remote from the imaging unit 102 and connected thereto via a network. In this case, the image generation unit 103 may be provided independently as a processing apparatus that processes the measurement projection data.

The input unit 101 has a hardware configuration included in a general-purpose computer, and includes a keyboard 111 and a mouse 112 as an input/output unit, a memory 113 as a storage unit, an HDD (hard disk drive) device 115, a central processing unit (CPU) 114 as a processing unit, etc. In addition, the image generation unit 103 includes a data collection system (data acquisition system, hereinafter DAS) 118, a memory 119 as a storage unit, a central processing unit 120 as a processing unit, an HDD device 121 as a storage unit, and a monitor 122 as a display unit, etc. The input unit 101 and the image generation unit 103 may correspond to independent hardware, or may be configured to share the hardware.

As illustrated in FIG. 2, the input unit 101 functions as an imaging condition input unit 131 that inputs an imaging condition. The imaging unit 102 functions as an imaging controller 132 that controls imaging based on an imaging condition input by the imaging condition input unit 131, and an imaging operation unit 133 that performs X-ray irradiation and detection. The image generation unit 103 functions as a signal collection unit 134 that converts a detected X-ray signal into a digital signal, the correction processing unit 135 that corrects the digital signal, the high absorber processing unit 136 that converts a projection data value of the high absorber for corrected projection data, the image reconstruction unit 137 that reconstructs an image for the projection data, and an image display unit 138 that outputs a reconstructed tomosynthesis image. Naturally, the signal collection unit 134 that performs AD conversion may be installed in the imaging unit 102, and the imaging unit 102 may output measurement projection data as a digital signal. Such a configuration is preferable when the image generation unit 103 is connected via a network.

As illustrated in FIG. 1, the input unit 101 includes the keyboard 111 and the mouse 112 to input an imaging condition. In addition, although not illustrated, other input units such as a pen tablet and a touch panel may be provided. Further, the input unit 101 includes the CPU 114, a storage unit such as the memory 113 or the HDD device 115, and a monitor (not illustrated). Each component is connected by a data bus 101a.

Data input from the keyboard 111, etc. is transferred to the CPU 114 as a processing unit. The CPU 114 functions as the imaging condition input unit 131 of FIG. 2 by loading and starting a predetermined program stored in the memory 113, the HDD device 115, etc. in advance. In addition, the CPU 114 transmits a control signal to the imaging unit 102 by loading and starting another program and also functions as a part of the imaging controller 132 of FIG. 2.

Similarly to a general X-ray tomosynthesis apparatus, the X-ray generator 1 and the X-ray detector 2 of the imaging unit 102 of FIG. 1 implements irradiation and detection of an X-ray on the subject 3. A typical example of a distance between an X-ray generation point of the X-ray generator 1 and an X-ray input surface of the X-ray detector 2 is 1,200 [mm]. Here, a configuration is such that the X-ray generator 1 moves with respect to the subject 3 and the X-ray detector 2. An angle between a central axis of the X-ray emitted from the X-ray generator 1 when performing tomosynthesis shooting and a normal to a surface of the bed 4 on which the subject 3 is mounted is referred to as a projection angle. When a position where the X-ray generator 1 and the X-ray detector 2 face each other is set to 0 degree, a typical example of a range of the projection angle is ±20 degrees. A typical example of the number of projections taken by the imaging unit 102 in one tomosynthesis shot is 60. In this case, each time the X-ray generator 1 moves by 0.67 degrees, one shot is taken. A typical example of a time required for tomosynthesis shooting in a range of the projection angle ±20 degrees is 10.0 [s]. The X-ray detector 2 includes a known X-ray detection element including a scintillator, a photodiode, etc., and a plurality of detection elements is arranged in a 2D direction in a plane parallel to the bed 4.

For example, the number of X-ray detection elements in an X-direction and a Y-direction arranged two-dimensionally in the X-ray detector 2 is 2000×2000. A typical example of a size of each X-ray detection element is 0.2 [mm]. Note that each specification is not limited to the above values, and can be variously changed according to the configuration of the X-ray tomosynthesis apparatus.

The image generation unit 103 includes a processing unit including the DAS 118 and the CPU 120, a storage unit such as the memory 119 or the HDD device 121, and the monitor 122. These components are connected by a data bus 103a. The DAS 118 functions as the signal collection unit 134 of FIG. 2.

The CPU 120, which is a processing unit, loads and starts a predetermined program stored in advance in the memory 119, the HDD device 121, etc. to implement functions of the correction processing unit 135, the high absorber processing unit 136, and the image reconstruction unit 137 of FIG. 2 by software. Note that in the present embodiment, at least a part or all of the high absorber processing unit 136 can be implemented by hardware. For example, it is sufficient to perform circuit design that the high absorber processing unit 136 is configured using a custom IC such as an application specific integrated circuit (ASIC) or a programmable IC such as a field-programmable gate array (FPGA), and an operation of the high absorber processing unit 136 is performed.

The monitor 122 functions as the image display unit 138.

A signal detected by the X-ray detector 2 of the imaging unit 102 is collected by the DAS 118 functioning as the signal collection unit 134, converted into a digital signal, and transferred to the CPU 120. The CPU 120 performs correction by the functions of the correction processing unit 135, the high absorber processing unit 136, and the image reconstruction unit 137, and performs image reconstruction using FBP processing. In addition, data is stored in the HDD device 121, etc., and the data is input/output to/from the outside as necessary. The tomosynthesis image undergoing image reconstruction is displayed on the monitor 122 such as a liquid crystal display or a CRT that functions as the image display unit 138. As described above, the CPU 120, the HDD device 121, the monitor 122, etc. can be shared with the input unit 101.

Figure 6:
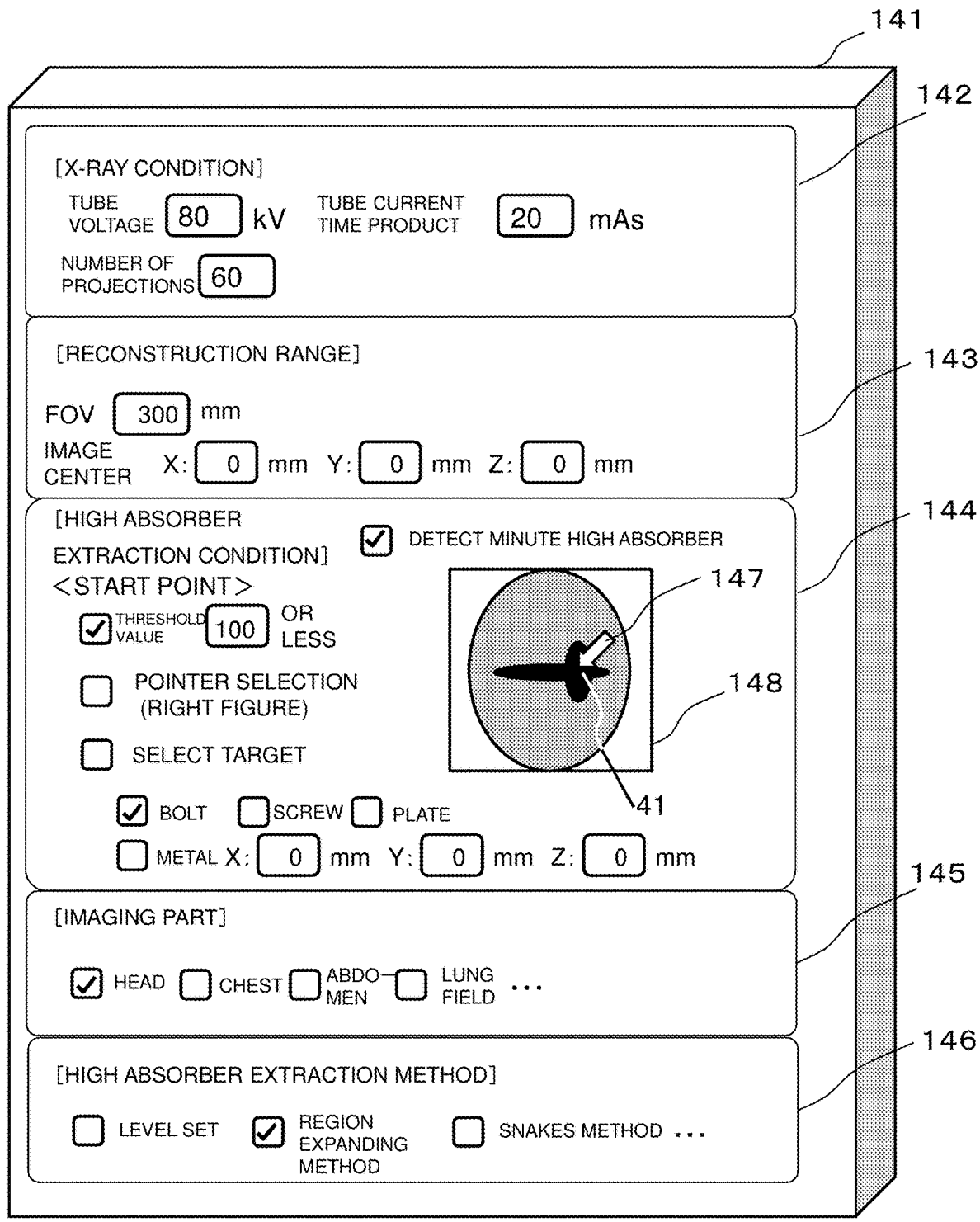
FIG. 6 is a diagram for description of an imaging condition receiving screen in the embodiment.

Next, a flow of an imaging operation of the X-ray tomosynthesis apparatus of the embodiment will be described by focusing on the functional block diagram of FIG. 2 using the hardware configuration of FIG. 1 and a screen example of FIG. 6. FIG. 6 is a diagram illustrating an example of the imaging condition receiving screen 141 displayed on the monitor 122 of the imaging condition input unit 131.

The imaging condition input unit 131 of FIG. 2 displays the imaging condition receiving screen 141 of FIG. 6 on the monitor 122 and receives an input of the operator. The imaging condition receiving screen 141 of FIG. 6 includes an X-ray condition setting region 142 for the operator to set a tube voltage corresponding to energy and an output amount of an irradiated X-ray, a tube current time product, and the number of projections in one tomosynthesis shot, a reconstruction range setting region 143 for the operator to set a range of a reconstruction image, a high absorber setting region 144 for the operator to select a desired high absorber extraction condition, an imaging part setting region 145 for the operator to set an imaging part, and an extraction method setting region 146 for the operator to select a method of extracting the high absorber.

The operator operates the mouse 112, the keyboard 111, etc. while viewing the imaging condition receiving screen 141 to set an X-ray condition in the X-ray condition setting region 142, a reconstruction range in the reconstruction range setting region 143, a desired high absorber extraction condition in the high absorber setting region 144, an imaging part in the imaging part setting region 145, and a method of extracting the high absorber in the extraction method setting region 146, respectively. Hereinafter, setting of an imaging condition and a reconstruction condition according to the invention will be described in detail with reference to FIG. 6.

As an example, FIG. 6 illustrates an example in which a tube voltage value 80 [kV], a tube current time product 20 [mAs], and the number of projections 60 are set in the X-ray condition setting region 142 by the operator. Note that FIG. 6 illustrates an example of using an X-ray having one type of energy spectrum. However, in the case of multi-energy imaging using two or more types of X-rays, the operator adds items of tube voltage, tube current time product, and number of times of imaging to the X-ray condition setting region 142, and similarly performs setting for each type of X-ray.

In addition, in the reconstruction range setting region 143 of FIG. 6, the operator sets a reconstruction range (field of view, hereinafter referred to as FOV) corresponding to a region for performing image reconstruction. The reconstruction range setting region 143 of FIG. 6 has a configuration in which the operator sets a reconstruction range by setting a size and a center position of the FOV. In the present embodiment, as an example, the FOV is defined as a square. In the example of FIG. 6, a side of the FOV is set to 300 [mm], and the center position of the FOV is equal to the center of rotation when movement of the X-ray generator 1 is assumed to be a circular orbit and set to X=Y=Z=0 [mm]. However, the FOV is not limited to the square, and may be set to any shape such as a circle, a rectangle, a cube, a rectangular parallelepiped, or a sphere. Also in this case, the configuration of the present embodiment can be applied.

In the high absorber setting region 144 of FIG. 6, the operator selects "whether or not to detect a minute high absorber" and sets a first start point 41 of region extraction.

When the operator selects to detect a minute high absorber in the high absorber setting region 144, the high absorber processing unit 136 causes the shift processing unit 21 and the spatial frequency increasing unit 22 of FIG. 2 to operate as described below in detail, so that the 3D region extraction unit 151 and the 2D region extraction unit 152 can extract a region of a minute high absorber with high accuracy.

As a method of setting the first start point 41 of region extraction, as illustrated in FIG. 6, a method in which the operator inputs a threshold value of a measurement projection data value and sets a point of measurement projection data less than or equal to the input threshold value as the first start point 41, a method in which the operator selects a point in a region of the high absorber on the acquired measurement projection data 148 using a pointer 147, and a method in which the operator selects information of the high absorber are prepared in the present embodiment. However, the method of setting the first start point 41 is not limited to this method, and any method may be used as long as one or more points in the high absorbent region can be designated.

In the example of FIG. 6, specifically, a threshold value of 100 or less is set as the threshold value of the measurement projection data value by the operator. Therefore, a point indicating the measurement projection data equal to or smaller than the threshold value 100 is set as the first start point 41.

In addition, in the imaging part setting region 145 of FIG. 6, the operator selects an X-ray irradiation target (a site or a tissue such as a head, a chest, or a lung field) as an imaging part. In the example of FIG. 6, the head is selected.

In the present embodiment, as a method of extracting the high absorber region, any method may be used as long as the region is extracted by expanding (or reducing) a region from a point or a region where region extraction is started. In addition to the above-described region expanding method in which the region is expanded from the start point, it is possible to use a snakes method of extracting a region based on an initial shape, a level set method of extracting a region based on an initial value, and a graph cut method of extracting a region based on an initial seed. In the extraction method setting region 146 of FIG. 6, the operator selects a region setting method from among the region expanding method, the snakes method, the level set method, the graph cut method, etc. corresponding to known image processing technologies. Note that when a method of extracting a region from a start region (start shape) instead of a start point, such as the snakes method, is selected as the region extraction method, the imaging condition input unit 131 may receive input of the start region (start shape) from the operator in the high absorber setting region 144 of FIG. 6 described above. In addition, the imaging condition input unit 131 may receive setting of the first start point 41 from the operator in the high absorber setting region 144, and set a start region (start shape) of a predetermined shape to include the first start point 41.

Note that the imaging condition receiving screen 141 is not limited to the screen configuration of FIG. 6. In addition, an X-ray condition, a reconstruction range, a high absorber setting condition, a setting condition of an imaging part, and an extraction method, settings of which are received by the imaging condition receiving screen 141, may be stored in the HDD device 115 in advance, and the imaging condition input unit 131 may read the setting condition, etc. from the HDD device 115. In this case, the operator may not input the X-ray condition, etc. each time. In addition, it is possible to adopt a configuration in which a plurality of types of combinations of the setting conditions is stored in advance, and the operator selects one from the plurality of types.

Subsequently, the imaging unit 102 of FIG. 2 performs tomosynthesis shooting according to an imaging condition received by the imaging condition input unit 131 from the operator. When the operator gives an instruction to start imaging using the mouse 112, the keyboard 111, etc., the CPU 114 outputs a control signal to a detector controller 116 and an X-ray controller 117 of the imaging controller 132. The X-ray controller 117 receives the control signal to drive the mechanism unit 1a, and performs control to move the X-ray generator 1 in a body axis direction. Movement of the X-ray generator 1 is stopped at the time when the imaging part of the subject 3 coincides with an X-ray passage range between the X-ray generator 1 and the X-ray detector 2, that is, an imaging position. In this way, arrangement of the subject 3 at an imaging start position is completed.

In addition, the X-ray controller 117 starts movement of the X-ray generator 1 via a drive motor of the mechanism unit 1a at the same time as the start of imaging is commanded from the CPU 114. When the movement of the X-ray generator 1 enters a constant-speed state and the arrangement of the subject 3 at the imaging position is completed, the CPU 114 instructs the X-ray controller 117 about the X-ray irradiation timing of the X-ray generator 1 and the imaging timing of the X-ray detector 2. The X-ray controller 117 causes the X-ray generator 1 to emit X-rays according to the instruction, and the detector controller 116 causes the X-ray detector 2 to detect X-rays. Further, the X-ray controller 117 determines an energy spectrum and an output amount of the irradiated X-rays based on, for example, a tube voltage and a tube current time product of the X-ray generator 1 set by the operator.

Note that even though an example of using X-rays having one type of energy spectrum has been described here, the configuration of the present embodiment can be applied to tomosynthesis of multi-energy imaging. In such a case, for example, control is performed so that the tube voltage is switched at high speed during each movement or during one movement to irradiate X-rays having two or more types of energy spectra to acquire imaging data.

The signal collection unit 134 of the image generation unit 103 converts an output signal of the X-ray detector 2 into a digital signal, and stores the digital signal in the memory 119. For this data, the correction processing unit 135 performs a correction such as an offset correction for calibrating a zero value of an X-ray detection signal or a known air calibration process for correcting sensitivity between detection elements to obtain measurement projection data of the subject 3. The measurement projection data is sent to the high absorber processing unit 136 and the image reconstruction unit 137.

The high absorber processing unit 136 implemented by software, etc. includes the shift processing unit 21, the spatial frequency increasing unit 22, the 3D region extraction unit 151, the 2D region extraction unit 152, and the extracted region conversion unit 153 as illustrated in FIG. 2. Operations of these components will be described with reference to a flow of FIG. 8.

First, the shift processing unit 21 receives 2D measurement projection data corrected by the correction processing unit 135 for each projection angle (step 801). Here, as illustrated in FIG. 3A1, a projection angle range is set to (θ−N) to (θ+N).

The shift processing unit 21 sets the ROI 51 in the high absorber region of the 2D measurement projection data of the predetermined representative projection angle (here, θ) (step 802). For example, the shift processing unit 21 has a configuration in which a threshold process is performed on the 2D measurement projection data of the projection angle θ, the high absorber region 31 is roughly extracted, and the ROI 51 is set so that the contour of the ROI 51 is located at a position separated by a predetermined distance from a contour thereof. In addition, the shift processing unit 21 may display the 2D measurement projection data of the projection angle θ on the monitor 122, and set a range including the high absorber region 31 designated by the operator as the ROI 51 via the input unit 101 such as the mouse 112.

On 2D measurement projection data of a projection angle (θ−1) adjacent to the representative projection angle θ, the shift processing unit 21 searches for a region of a projection data value distribution similar to the ROI 51 of the representative projection angle θ using a pattern matching method, thereby setting the ROI 51. For 2D measurement projection data of a projection angle (θ+1), the ROI 51 is set by performing pattern matching using the ROI 51 of the representative projection angle θ. A data value distribution of the set ROI 51 is used to successively perform pattern matching on 2D measurement projection data of adjacent projection angles, thereby setting the ROI 51 on 2D measurement projection data at each projection angle (step 803). As described above, by performing pattern matching using the ROI 51 of adjacent projection angle, even when the shape of the high absorber region 31 slightly varies depending on the projection angle, the ROI 51 can be set for each projection angle.

The shift processing unit 21 calculates a shift amount for shifting 2D projection data for overlapping the ROI 51 of the 2D measurement projection data of the representative projection angle θ with at least a part of an ROI 51 of 2D projection data of another projection angle in a 2D plane for each projection angle (see FIG. 3B1, step 804). For example, the shift amount is obtained by obtaining a distance between the ROI 51 of the 2D measurement projection data of the representative projection angle θ and the ROI 51 of the 2D projection data of another projection angle.

The shift processing unit 21 shifts 2D projection data of a projection angle other than the representative projection angle according to the shift amount calculated in step 804 (see FIG. 3B1, step 805). In this way, when pieces of the 2D measurement projection data are arranged (overlapped) using a projection angle direction as the z direction as in FIG. 3B2, the high absorber region 31 of the 2D measurement projection data becomes the 3D high absorber region 42 continuous in the z direction. Therefore, in step 808 described below, the minute high absorber region 31 can be continuously extracted three-dimensionally.

Figure 5C:
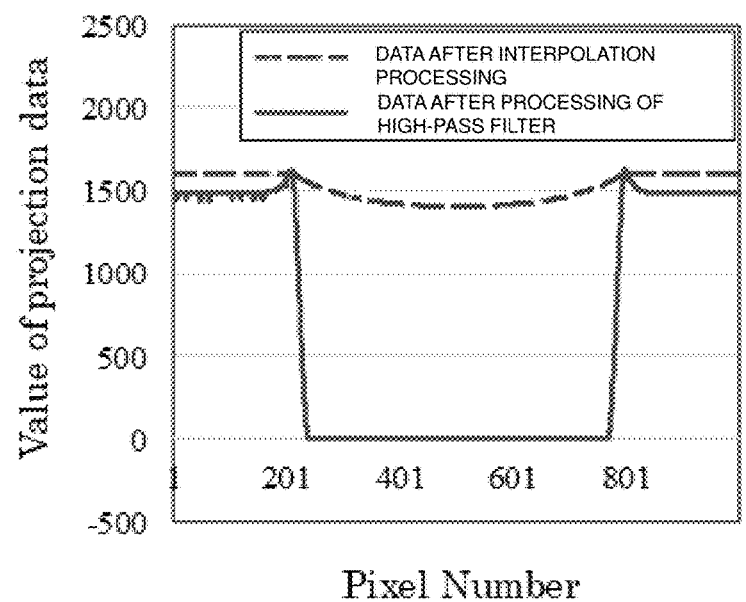
FIG. 5C is a graph illustrating data values after an interpolation process of the 2D measurement projection data of the embodiment, and a graph illustrating data values obtained by processing the data values using a high-pass filter.

Subsequently, the interpolation processing unit 22a of the spatial frequency increasing unit 22 performs the interpolation process on data in the ROI 51 (see FIG. 5A), thereby increasing the spatial frequency (FIG. 5B, FIG. 5C, and step 806). As an interpolation method, for example, linear interpolation is performed. Specifically, a bilinear interpolation process can be used. As illustrated in FIG. 5C, data after the interpolation process has an increased data density, and has a gradual change as a projection data value.

Therefore, the high-frequency emphasis processing unit 22b of the spatial frequency increasing unit 22 processes the projection data value after the interpolation process using a high-pass filter, thereby obtaining data in which a projection data value in the high absorber region 31 becomes 0 and a projection data value in a region outside the high absorber region 31 becomes a predetermined value as illustrated in FIG. 5C (high-frequency emphasis processing) (step 807). In this way, in a process of extracting a 3D region of step 808 and a process of extracting a 2D region of step 809 described later, a steep contour of the high absorber region 31 can be accurately detected as illustrated in FIG. 3B1, and thus the high absorber region 31 can be obtained with high accuracy by region expansion. Note that a filter value of the high-pass filter is set in advance so that a diameter of a region in which a projection data value after filter processing of the high-pass filter becomes 0 is equal to a diameter of the actual high absorber region 31.

Note that steps 807 and 808 may be performed before shift processing (between step 804 and step 805).

Subsequently, the 3D region extraction unit 151 uses the first start point 41 received by the imaging condition input unit 131 to obtain the 3D high absorber region 42 using a 3D region expanding method, and sets a start point in the 2D measurement projection data for each projection angle (step 808).

Figure 7A:
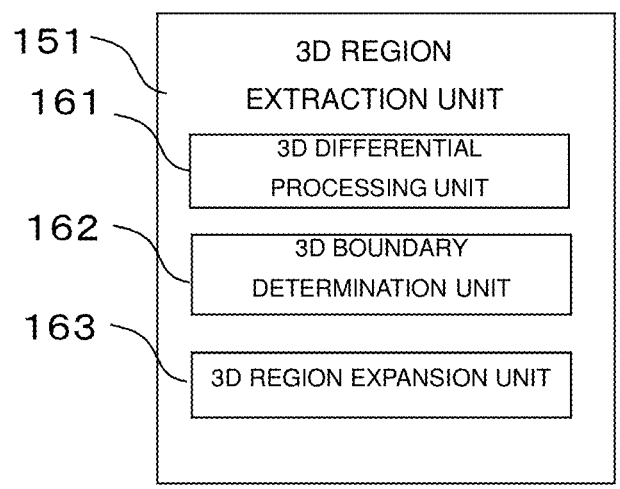
FIG. 7A is a functional block diagram of a 3D region extraction unit 151 of the embodiment.

Processing of step 808 will be described in more detail. The 3D region extraction unit 151 includes the 3D differential processing unit 161 that performs 3D differential processing on 3D measurement projection data in which pieces of 2D measurement projection data for each projection angle are arranged in the projection angle direction, a 3D boundary determination unit 162 that determines a threshold value an or more to be a boundary with respect to a gradient image acquired by differential processing, and a 3D region expansion unit 163 that expands a region to satisfy an inside of the boundary based on setting received by the imaging condition receiving screen 141 (FIG. 7A).

Figure 8:
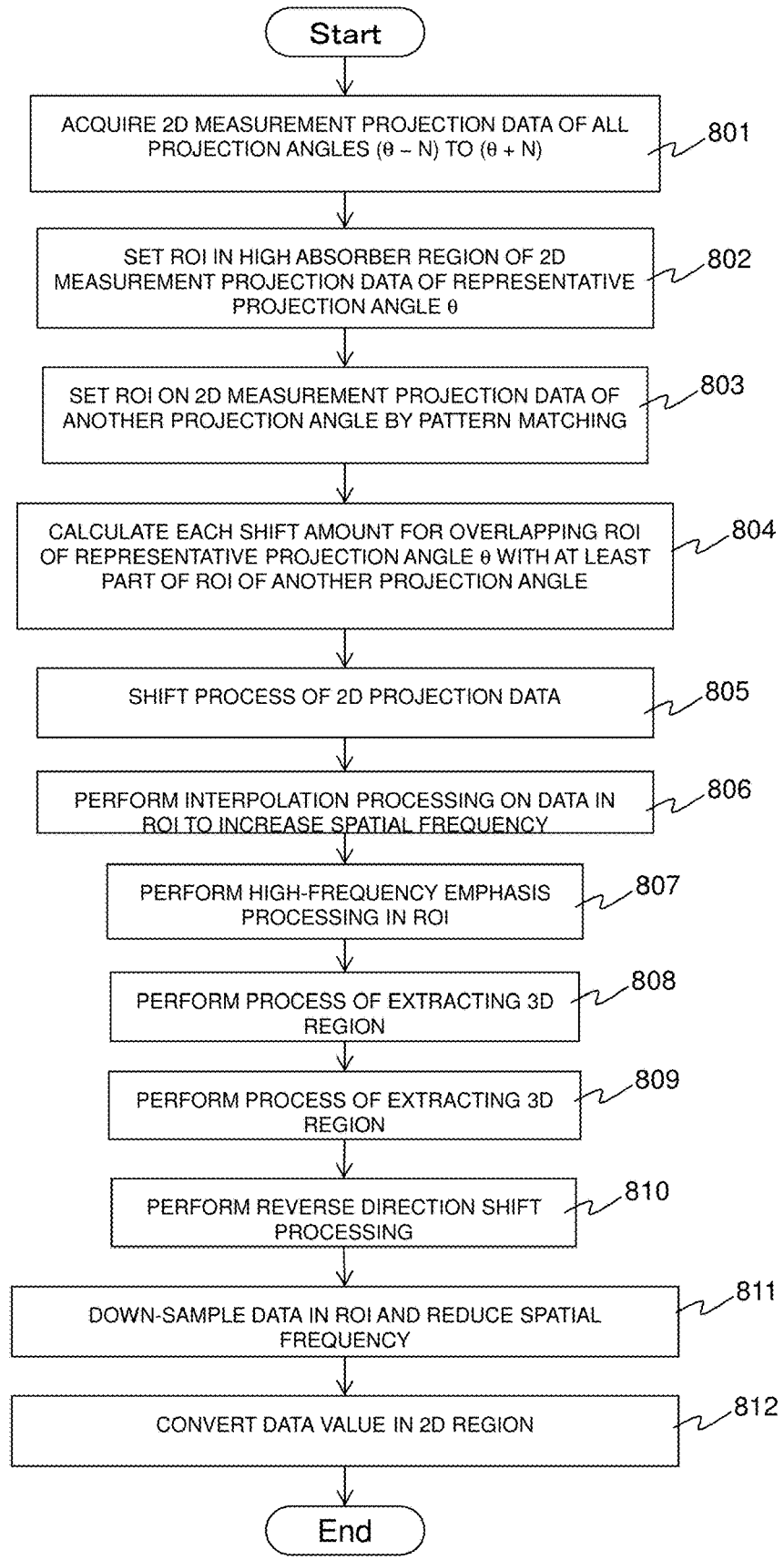
FIG. 8 is a flowchart for description of a processing procedure of a high absorber processing unit 136 of the embodiment.

For example, the 3D differential processing unit 161 performs partial differential calculation in the 3D direction which is, for example, a known image processing technology on f(x, y, z) corresponding to 3D measurement projection data (3D sinogram) in which pieces of the 2D measurement projection data after processing of step 808 of FIG. 8 are arranged in the projection angle direction θ=z as shown in Equation (1) below, thereby calculating a gradient image $\nabla f(x, y, z)$ (step 171).

[Equation 1]

$$\nabla f(x, y, z) = \left|\frac{\partial f(x, y, z)}{\partial x}\right|ux + \left|\frac{\partial f(x, y, z)}{\partial y}\right|uy + \alpha \times \left|\frac{\partial f(x, y, z)}{\partial z}\right|uz = \left|\frac{f(x+1, y, z) - f(x-1, y, z)}{2}\right|ux + \left|\frac{f(x, y+1, z) - f(x, y-1, z)}{2}\right|uy + \alpha \times \left|\frac{f(x, y, z+1) - f(x, y, z-1)}{2}\right|uz \quad (1)$$

$\nabla f(x, y, z)$ of Equation (1) indicates a gradient of f (x, y, z). Hereinafter, $\nabla f(x, y, z)$ is referred to as a gradient image, data thereof is referred to as a pixel, and a data value is referred to as a pixel value.

In Equation (1), a coefficient $\alpha$ before a third term (uz) is a coefficient determined by the number of projections (projection angle interval) and generally increases as the projection angle interval increases. The origin corresponds to a detector at an upper left of a front in a first projection after start of imaging. "ux" and "uy" indicate unit vectors of detector numbers in a horizontal direction and a vertical direction. uz indicates a unit vector in the projection angle direction. Equation (1) calculates a gradient image of measurement projection data using values of six (6) neighboring detector elements in a 3×3×3 detector. However, according to S/N of the measurement projection data, for example, when noise is large, the gradient image may be calculated using values of eighteen (18) neighboring detector elements.

Subsequently, in the 3D boundary determination unit 162, for the gradient image $\nabla f(x, y, z)$ acquired after the partial differential calculation, as shown in Equation (2), the threshold value an or more determined in advance is set to a boundary pixel b(x, y, z)=1, and a value less than the threshold value an is set to a boundary pixel b(x, y, z)=0. In this way, as illustrated in FIG. 4A, a pixel at a position (boundary) where the measurement projection data sharply changes at a boundary between the measurement projection data of the 3D high absorber region and the surroundings is extracted with a pixel value of 1 (step 172). Note that a pixel inside the high absorber region 31 and a pixel outside the high absorber are set to 0.

[Equation 2]

$$b(x,y,z)=1(a_{3D} \leq \nabla f(x,y,z))$$

$$b(x,y,z)=0(a_{3D} > \nabla f(x,y,z)) \quad (2)$$

Next, the 3D region expansion unit 163 expands the region in the horizontal direction and the vertical direction of the X-ray detector 2, and the projection angle direction with the first start point 41 set by the operator as a start point. Specifically, for the pixel b(x, y, z)=0 at the first start point 41, only when the value of the adjacent pixel is 0, the pixel is determined to be a high absorber, and b(x, y, z) is changed to 2. Subsequently, it is determined whether a pixel further adjacent to the pixel of the high absorber changed to b(x, y, z)=2 corresponds to a high absorber, and when a value of the adjacent pixel is 0, b(x, y, z) is changed to 2. This process is repeated in the 3D direction until a condition that there is no pixel to be determined is reached (FIG. 4B). As a result, the 3D high absorber region 42 of the pixel b(x, y, z)=2 located inside the boundary of the high absorber is extracted (step 173).

Subsequently, the 3D region expansion unit 163 obtains a range occupied by the 3D high absorber region 42 in the 2D measurement projection data at a projection angle other than the projection angle at which the first start point 41 is set, and sets one or more points within the range as the second start points 43 in the 2D measurement projection data at the projection angle.

Subsequently, the 2D region extraction unit 152 extracts the high absorber region from the 2D measurement projection data at each projection angle based on the second start point 43 set in the 3D region expansion unit 163 (FIG. 4C, step 809).

Step 809 will be described in more detail.

Figure 7B:
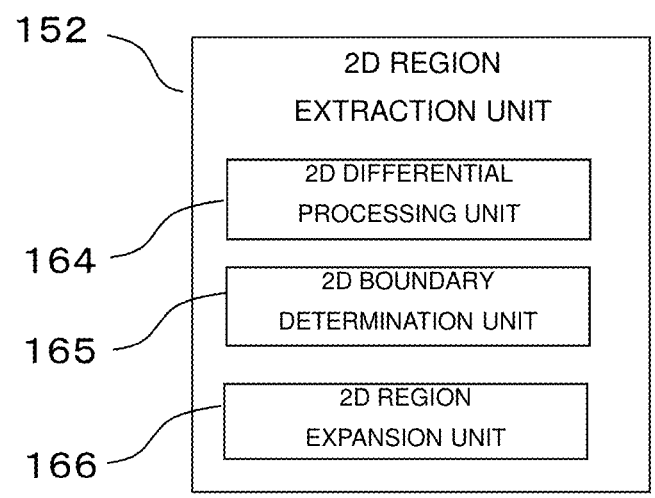
FIG. 7B is a functional block diagram of a 2D region extraction unit 152 of the embodiment.

The 2D region extraction unit 152 includes the 2D differential processing unit 164 that performs 2D differential processing on measurement projection data at each projection angle, a 2D boundary determination unit 165 that determines a threshold value an or more to be a boundary with respect to a gradient image acquired after differential processing, and a 2D region expansion unit 166 that expands and extracts a region to satisfy an inside of the boundary from the start point (FIG. 7B).

In the 2D differential processing unit 164, for example, partial differential calculation in the 2D direction which is, for example, a known image processing technology is performed on 2D measurement projection data g(x, y, z) in a horizontal direction x and a vertical direction y at a certain projection angle z as shown in Equation (3) below in step 174 of FIG. 9, thereby calculating a gradient image $\nabla g(x, y, z)$.

[Equation 3]

$$\nabla g(x, y, z) = \left|\frac{\partial f(x, y, z)}{\partial x}\right|ux + \left|\frac{\partial f(x, y, z)}{\partial y}\right|uy = \left|\frac{f(x+1, y, z) - f(x-1, y, z)}{2}\right|ux + \left|\frac{f(x, y, +1, z) - f(x, y-1, z)}{2}\right|uy \quad (3)$$

Figure 9:
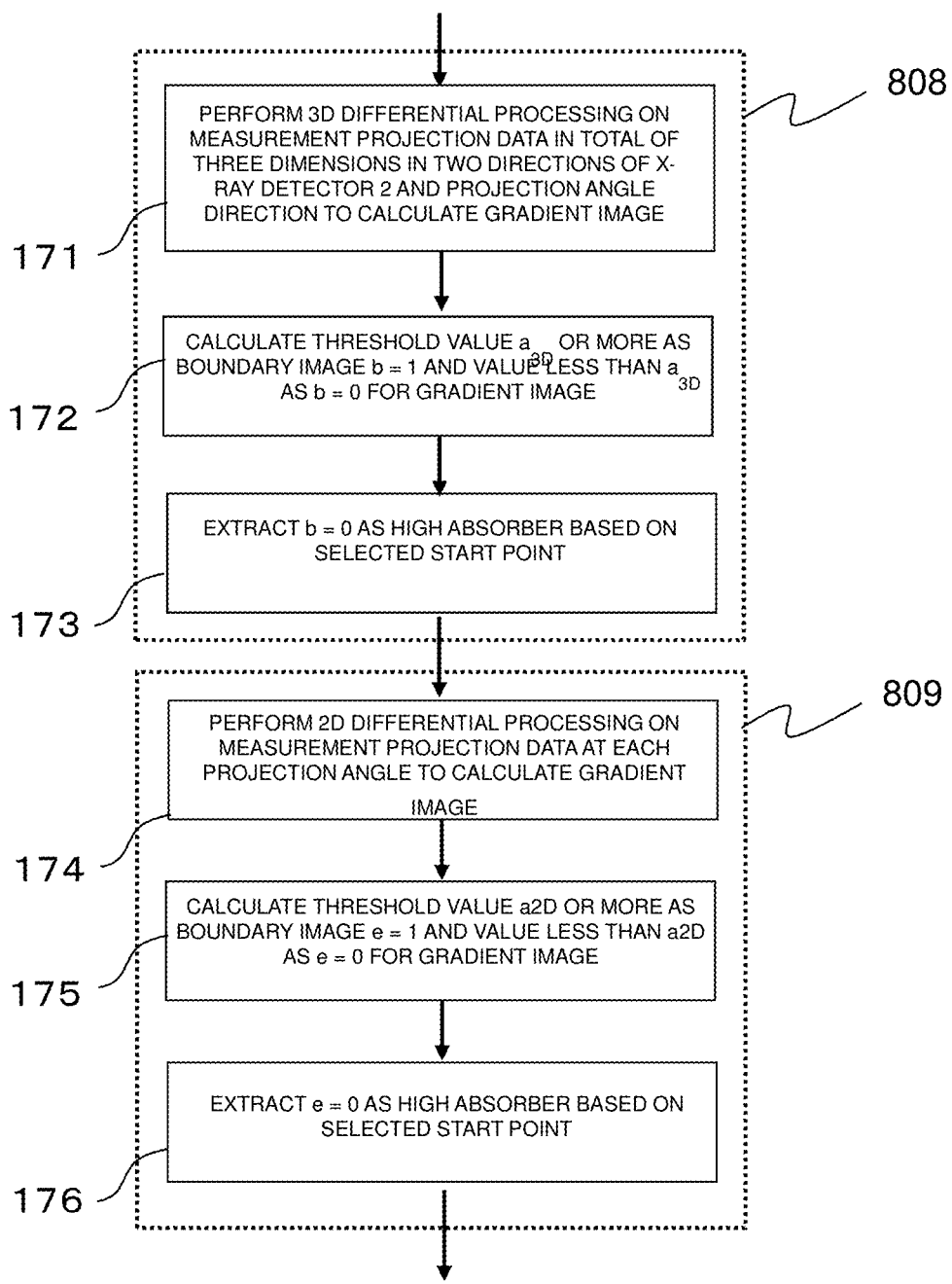
FIG. 9 is a flowchart illustrating steps 808 and 809 of FIG. 8 in detail.
Figure 11A:
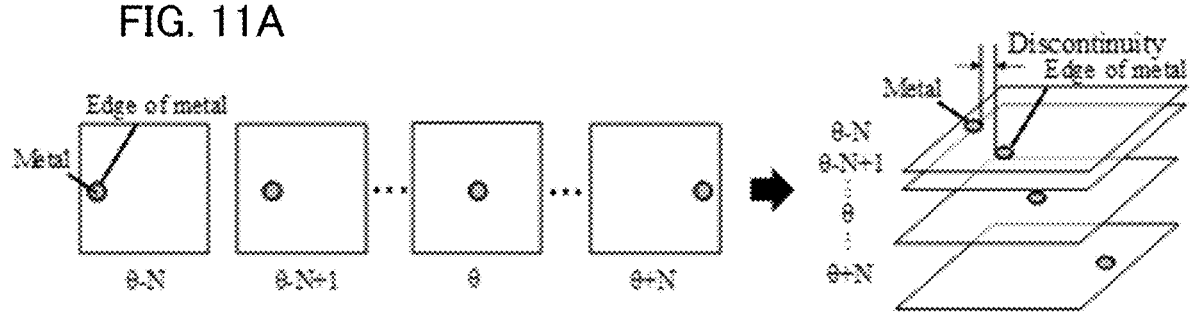
FIG. 11A is a diagram illustrating 2D measurement projection data including a minute high absorber region and 3D measurement projection data obtained by arranging pieces of the 2D measurement projection data in the projection angle direction.
Figure 11B:
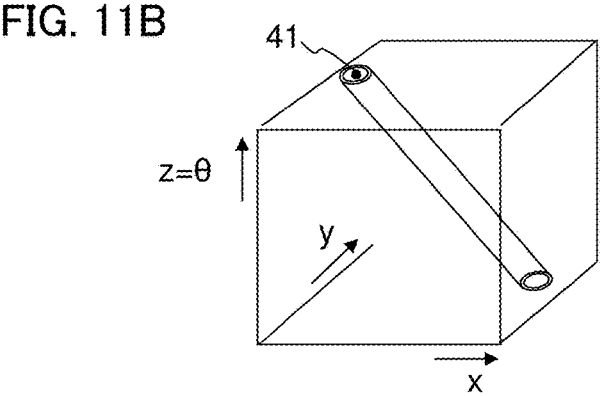
FIG. 11B is a diagram illustrating a shape example of the high absorber region in the 3D measurement projection data.

Next, in the 2D boundary determination unit 165, in step 175 of FIG. 9, with respect to the gradient image $\nabla g(x, y, z)$ acquired after partial differentiation calculation at each projection angle, as shown in Equation (4), a predetermined threshold value an or more is set to a boundary image e(x, y, z)=1, or a value less than the threshold value an is set to a boundary image e(x, y, z)=0 (see FIG. 4C).

[Equation 4]

$$e(x,y,z)=1(a_{2D} \leq \nabla g(x,y,z))$$

$$e(x,y,z)=0(a_{2D} > \nabla g(x,y,z)) \quad (4)$$

Figure 4D:
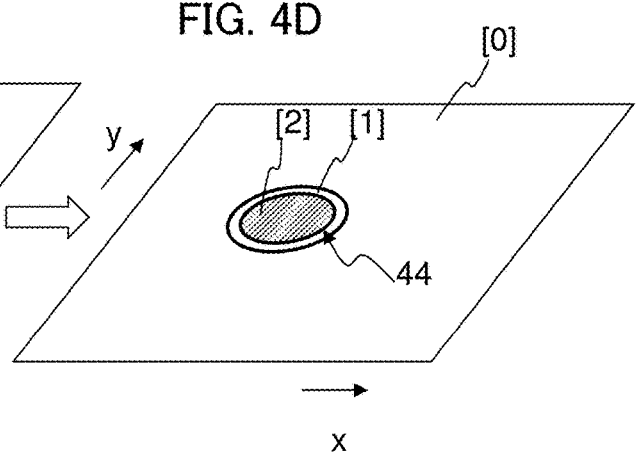
FIG. 4D is an explanatory diagram illustrating a processing result a 2D region expansion unit.

Subsequently, in the 2D region expansion unit 166, in step 176 of FIG. 9, the region is expanded in the horizontal direction and the vertical direction of the X-ray detector 2 on measurement projection data at each projection angle based on the second start point 43 set by the 3D region extraction unit 151. In this instance, for the pixel e(x, y, z)=0 at the start point, only when the value of the adjacent pixel is 0, the pixel is determined to be a high absorber, and e(x, y, z) is changed to 2. Similarly, a pixel adjacent to the determined pixel of the high absorber is determined, and the process is repeated until a condition that there is no pixel to be determined is reached. By processing of the 2D region extraction unit 152, the 2D high absorber region 44 of the measurement projection data is extracted at each projection angle (see FIG. 4D). In this way, it is possible to accurately extract the 2D high absorber region inside a boundary between the measurement projection data of the high absorber and the surroundings.

As described above, the 3D high absorber region 42 is obtained, and the 2D high absorber region 44 is obtained using the internal point as the second start point, so that the operator may not set the second start point 43 for each piece of 2D measurement projection data.

In addition, in the present embodiment, the spatial frequency in the ROI 51 is increased in step 806, and thus the 2D high absorber region 44 can be accurately obtained as illustrated in FIG. 5B.

Subsequently, the shift processing unit 21 shifts the 2D measurement projection data at each projection angle in a direction opposite to the shift direction in step 805 by the same shift amount as that in step 805 (step 810). In this way, as illustrated in FIG. 3A1, a position of the 2D measurement projection data in the 2D plane (xy plane) returns to a position at the time of acquisition in step 801.

Subsequently, the interpolation processing unit 22a of the spatial frequency increasing unit 22 samples the ROI 51 in each piece of the 2D measurement projection data using the spatial frequency of the 2D measurement projection data at the time of acquisition in step 801, thereby reducing and returning the spatial frequency to the same spatial frequency as that before the interpolation process (step 811).

The extracted region conversion unit 153 replaces a measurement projection data value of the 2D high absorber region 44 after processing in step 811 with a value of a substance having a lower X-ray absorption rate than that of the high absorber (metal, etc.). For example, as shown in Equation (5), the extracted region conversion unit 153 converts the projection data value f(x, y, z) of the 2D high absorber region 44 into a measurement projection data value f' (x, y, z) obtained by adding d times a difference (f(x, y, z)-c) to a measurement projection data value c of the representative high absorber. As an example, a coefficient d is set to d=1/10 in order to sufficiently reduce an influence of the artifact. In this way, it is possible to convert the measurement projection data value of the 2D high absorber region 44 into a measurement projection data value of a substance having a lower X-ray absorption rate than that of the high absorber without using a value of the peripheral region of the 2D high absorber region 44.

[Equation 5]

$$f'(x,y,z)=c+(f(x,y,z)-c) \times d \quad (5)$$

The measurement projection data value c of the representative high absorber can be estimated using information such as an imaging condition, a reconstruction condition, a position (x, y, z) of the subject in the 3D space, and an approximate position (x, y, z) and size of the high absorber. Alternatively, the value may be estimated by interpolation from a value in the surrounding region.

As described above, even when the size of the high absorber is small, the high absorber processing unit 136 can accurately obtain the 2D high absorber region 44 in the 2D measurement projection data and replace the measurement projection data value thereof.

The image reconstruction unit 137 performs reconstruction using the FBP method using the measurement projection data at each projection angle from the high absorber processing unit 136. In this way, it is possible to generate a tomosynthesis image in which artifacts generated from the high absorber are reduced.

Note that processing of step 810 for shifting the 2D measurement projection data in the reverse direction may be performed at any timing up to image reconstruction by the image reconstruction unit 137 after setting of the second start point 43, and may be performed before step 809, in the middle of step 809, or after the replacement process of step 811.

Note that in the 3D region extraction unit 151 and the 2D region extraction unit 152, the region expanding method used for region extraction is an example, and it is possible to adopt application to other methods such as graph cut, level set, and snakes method corresponding to known image processing technologies.

In the present embodiment, the pixel value of the extracted high absorber is converted into a specific value f'(x, y, z) that is less affected by artifacts. However, after measurement projection data of only the high absorber is separated from the measurement projection data, image reconstruction may be performed by the image reconstruction unit 137, respectively. In this instance, the image reconstruction unit 137 needs to perform a process of adding the high absorber and a reconstructed image other than the high absorber.

In the present embodiment, the X-ray detector 2 at a fixed position is used. However, the invention is applicable to a method in which imaging is performed while the X-ray detector 2 moves in synchronization with movement of the X-ray generator 1.

In the present embodiment, the tomosynthesis image is reconstructed using the measurement projection data obtained from one tomosynthesis shot. However, the invention is not limited to one time, and for example, the invention is applicable to reconstruction using measurement projection data at different times by two or more shots.

Furthermore, the present embodiment shows an X-ray tomosynthesis apparatus for a living body as an example. However, the configuration of the present embodiment can be applied to an X-ray tomosynthesis apparatus or a laminography apparatus for nondestructive inspection such as explosives inspection or product inspection.

What is claimed is:

1. An X-ray tomosynthesis apparatus comprising:
   an X-ray generator that irradiates a subject with an X-ray;
   an X-ray detector that detects an image obtained by projecting the X-ray transmitting through the subject onto a two-dimensional (2D) plane to obtain 2D measurement projection data;
   a mechanism unit that relatively moves at least one of the X-ray generator and the X-ray detector with respect to the subject and irradiates the subjects with X-rays from a plurality of different projection angles;
   a high absorber processing unit that extracts each high absorber region of an X-ray included in the 2D measurement projection data for each of the plurality of projection angles and converts a data value of the high absorber region; and
   an image reconstruction unit that reconstructs a tomosynthesis image based on a plurality of pieces of 2D measurement projection data processed by the high absorber processing unit,
   wherein the high absorber processing unit includes a shift processing unit and a three-dimensional (3D) region extraction unit,
   the shift processing unit shifts the 2D measurement projection data in the 2D plane thereof so that when pieces of the 2D measurement projection data for each of the plurality of projection angles are arranged in a projection angle direction, a part or all of a range of the high absorber region included in the 2D measurement projection data overlaps at least a range of the high absorber region included in 2D measurement projection data at an adjacent projection angle in an in-plane direction of the 2D plane,
   the 3D region extraction unit arranges the 2D measurement projection data for each of the plurality of projection angles shifted by the shift processing unit in the projection angle direction to obtain 3D measurement projection data, performs a region expansion process on the 3D measurement projection data from a preset first start point to obtain a 3D region satisfying a predetermined condition, and obtains a region occupied by the 3D region in the 2D measurement projection data,
   wherein after the 2D region extraction unit performs the region expansion process on the 2D measurement projection data, the shift processing unit shifts the 2D measurement projection data in a reverse direction to cancel out a shift amount of shifting the 2D measurement projection data.

2. The X-ray tomosynthesis apparatus according to claim 1,
   wherein the high absorber processing unit further includes a 2D region extraction unit, and
   the 2D region extraction unit performs a region expansion process using a point in a region occupied by the 3D region in the 2D measurement projection data as a second start point in the 2D measurement projection data to obtain a 2D region satisfying the predetermined condition, and defines the 2D region as a high absorber region of an X-ray included in the 2D measurement projection data.

3. The X-ray tomosynthesis apparatus according to claim 1,
   wherein the high absorber processing unit further includes a spatial frequency increasing unit, and
   the spatial frequency increasing unit includes
   an interpolation processing unit that sets each region of interest including the high absorber region in 2D projection data for each of the projection angles for the 2D measurement projection data before processing by the shift processing unit or the 2D measurement projection data after processing by the shift processing unit and before processing by the 3D region extraction unit, and performs an interpolation process on at least data in the region of interest to increase a spatial frequency, and
   a high-frequency emphasis processing unit that high-frequency emphasizes data after the interpolation process.

4. The X-ray tomosynthesis apparatus according to claim 3, wherein after the 2D region extraction unit obtains the 2D region, the spatial frequency increasing unit samples data of the region of interest to reduce a spatial frequency.

5. The X-ray tomosynthesis apparatus according to claim 1, wherein the shift processing unit sets each region of interest including the high absorber region in 2D measurement projection data for each of the plurality of projection angles, obtains a distance in the 2D plane between the region of interest of the 2D measurement projection data at a predetermined representative projection angle and the region of interest of the 2D measurement projection data at another projection angle to obtain a shift amount for each projection angle, and shifts the 2D measurement projection data at the projection angle by the obtained shift amount.

6. The X-ray tomosynthesis apparatus according to claim 5, wherein the shift processing unit sets the region of interest including the high absorber region on 2D measurement projection data at a predetermined projection angle, searches for a distribution of measurement projection data having a pattern similar to a distribution of the measurement projection data in the region of interest by pattern matching on 2D measurement projection data at another projection angle, and sets the region of interest.

7. The X-ray tomosynthesis apparatus according to claim 6, wherein the shift processing unit successively sets the region of interest by performing the pattern matching between pieces of 2D projection data at contiguous projection angles.

8. The X-ray tomosynthesis apparatus according to claim 6, wherein the high absorber processing unit further includes a receiving unit that receives a selection from an operator as to whether to perform a process of detecting a minute high absorber, and when the receiving unit receives a selection for performing the process of detecting the minute high absorber, the shift processing unit performs shift processing.

9. An image processing apparatus for receiving and processing 2D measurement projection data for each of a plurality of projection angles, the image processing apparatus comprising:

a high absorber processing unit that extracts each high absorber region of an X-ray included in a plurality of pieces of the 2D measurement projection data and converts a data value of the high absorber region; and an image reconstruction unit that reconstructs a tomosynthesis image based on the plurality of pieces of 2D measurement projection data processed by the high absorber processing unit, wherein the high absorber processing unit includes a shift processing unit and a 3D region extraction unit, the shift processing unit shifts the 2D measurement projection data in a 2D plane thereof so that when pieces of the 2D measurement projection data for each of the plurality of projection angles are arranged in a projection angle direction, a part or all of a range of the high absorber region included in the 2D measurement projection data overlaps at least a range of the high absorber region included in 2D measurement projection data at an adjacent projection angle in an in-plane direction of the 2D plane, and the 3D region extraction unit arranges the 2D measurement projection data for each of the plurality of projection angles shifted by the shift processing unit in the projection angle direction to obtain 3D measurement projection data, performs a region expansion process on the 3D measurement projection data from a preset first start point to obtain a 3D region satisfying a predetermined condition, and obtains a region occupied by the 3D region in the 2D measurement projection data, wherein after the 2D region extraction unit performs the region expansion process on the 2D measurement projection data, the shift processing unit shifts the 2D measurement projection data in a reverse direction to cancel out a shift amount of shifting the 2D measurement projection data.

10. A non-transitory computer readable medium storing a program for causing a computer to function as high absorber processing means that extracts each high absorber region of an X-ray included in a plurality of pieces of 2D measurement projection data and converts a data value of the high absorber region, wherein the high absorber processing means includes means that shifts the 2D measurement projection data in a 2D plane so that when pieces of the 2D measurement projection data for each of the plurality of projection angles are arranged in a projection angle direction, a part or all of a range of the high absorber region included in the 2D measurement projection data overlaps at least a range of the high absorber region included in 2D measurement projection data at an adjacent projection angle in an in-plane direction of the 2D plane, and means that arranges the 2D measurement projection data for each of the plurality of projection angles shifted by the shift processing means in the projection angle direction to obtain 3D measurement projection data, performs a region expansion process on the 3D measurement projection data from a preset first start point to obtain a 3D region satisfying a predetermined condition, and obtains a region occupied by the 3D region in the 2D measurement projection data, wherein after the 2D region extraction unit performs the region expansion process on the 2D measurement projection data, the means that shifts the 2D measurement projection data shifts the 2D measurement projection data in a reverse direction to cancel out a shift amount of shifting the 2D measurement projection data.

* * * * *